(12) United States Patent
Kolder et al.

(10) Patent No.: US 11,604,036 B2
(45) Date of Patent: Mar. 14, 2023

(54) HEAT TRANSFER DEVICE

(71) Applicant: Hanon Systems, Daejeon (KR)

(72) Inventors: Petr Kolder, Rožnov pod Radhoštěm (CZ); Martin Bohac, Ostrava (CZ); Martin Sopuch, Ženklava (CZ); Milan Chytrý, Nový Jičín (CZ); Leo Somhorst, Kerpen (DE)

(73) Assignee: Hanon Systems, Daejeon (KR)

( * ) Notice: Subject to any disclaimer, the term of this patent is extended or adjusted under 35 U.S.C. 154(b) by 26 days.

(21) Appl. No.: 17/346,383

(22) Filed: Jun. 14, 2021

(65) Prior Publication Data

US 2021/0302110 A1    Sep. 30, 2021

Related U.S. Application Data

(62) Division of application No. 16/431,282, filed on Jun. 4, 2019, now Pat. No. 11,060,803.

(30) Foreign Application Priority Data

Jun. 5, 2018 (DE) .......................... 102018113341.3

(51) Int. Cl.
*F28D 1/00* (2006.01)
*F28F 9/00* (2006.01)
(Continued)

(52) U.S. Cl.
CPC .......... *F28F 9/001* (2013.01); *F02B 29/0462* (2013.01); *F28D 7/0025* (2013.01);
(Continued)

(58) Field of Classification Search
CPC .... F28F 9/001; F02B 29/0462; F28D 7/0025; F28D 7/10; F28D 7/1684; F28D 2021/0082
(Continued)

(56) References Cited

U.S. PATENT DOCUMENTS

2006/0108097 A1   5/2006  Hodes et al.
2008/0289804 A1   11/2008 Baumann et al.

FOREIGN PATENT DOCUMENTS

DE    102006051000 A1   7/2007
DE    102009055715 A1   6/2011
(Continued)

*Primary Examiner* — Davis D Hwu
(74) *Attorney, Agent, or Firm* — Norton Rose Fulbright US LLP; James R. Crawford

(57) ABSTRACT

Device for heat transfer between a first fluid and one second fluid includes a housing with first housing element, second housing element and heat transfer element. Housing is developed with a first connecting fitting and a second connecting fitting for each fluid. Heat transfer element is disposed in a volume completely enclosed in a housing and is developed for through-conduction of the first fluid. Housing is developed for conduction of the second fluid about the heat transfer element. Connecting fittings for second fluid are either disposed on the first housing element and the connecting fittings for the first fluid are disposed on the second housing element, wherein within the second housing at least one flow path for conducting the first fluid is implemented which extends between a connecting fitting and a collector region or the connecting fittings for the fluids are disposed on the first housing element.

8 Claims, 6 Drawing Sheets

(51) Int. Cl.
  *F02B 29/04* (2006.01)
  *F28D 7/10* (2006.01)
  *F28D 7/00* (2006.01)
  *F28D 7/16* (2006.01)
  *F28D 21/00* (2006.01)

(52) U.S. Cl.
  CPC ............ *F28D 7/10* (2013.01); *F28D 7/1684* (2013.01); *F28D 2021/0082* (2013.01)

(58) Field of Classification Search
  USPC .......................................................... 165/148
  See application file for complete search history.

(56) References Cited

FOREIGN PATENT DOCUMENTS

| | | | |
|---|---|---|---|
| DE | 102012208771 | A1 | 11/2013 |
| DE | 102016001391 | A1 | 8/2016 |
| DE | 102016100305 | A1 | 7/2017 |
| EP | 0 285 504 | A1 | 10/1988 |
| EP | 2 014 892 | A1 | 1/2009 |
| KR | 20070008550 | * | 1/2007 |
| WO | 2006125919 | A1 | 11/2006 |

\* cited by examiner

HEAT TRANSFER DEVICE

CROSS REFERENCE TO RELATED APPLICATIONS

The present application is a divisional application of U.S. patent application Ser. No. 16/431,282, filed on Jun. 4, 2019, which claims priority from German Patent Application No. 10 2018 113 341.3, filed on Jun. 5, 2018, both of which are hereby incorporated by reference in their entireties.

FIELD OF THE INVENTION

The invention relates to devices for heat transfer between at least one first fluid and at least one second fluid, in particular for application in a passenger motor vehicle. A device comprises a housing with a first housing element and a second housing element as well as a heat transfer element. The housing is in each instance developed with a first connecting fitting and a second connecting fitting for each fluid. The heat transfer element developed for the through-conduction of the first fluid is disposed in a volume completely enclosed by the housing. The housing for conducting the second fluid is herein implemented about the heat transfer element.

BACKGROUND INFORMATION

Heat exchangers of the above described heat transfer class serve primarily for cooling lost or waste or off-gases, in particular of internal combustion engines, into which the fresh air to be supplied to the combustion process is mixed in order to attain, on the one hand, a reduction of the oxygen content. On the other hand, the heat energy of the lost or waste or off-gas is also utilized. A heat exchanger of the class is, for example, also utilized on the suction side of supercharged engines or in connection with fuel cells.

EP 2 014 892 A1 discloses a heat exchanger arrangement with a charge air cooler and a housing. The charge air cooler comprises a heat exchanger core, a header plate, a coolant entry duct and a coolant exit duct. The heat exchanger core is implemented of heat transfer elements for the throughflow of a coolant. The housing has the form of a chamber with a single opening for receiving the heat exchanger core as well as an air entry duct, an air exit duct and a flange. The heat exchanger core is disposed within the chamber of the housing, wherein the header plate is in contact on the flange of the housing and the heat exchanger core is fixed on the flange of the housing. The header plate closes off the aperture of the chamber of the housing.

In EP 0 285 504 a heat exchanger is described that comprises a two-part housing with a receiving element and a cover element. The receiving element comprises connecting fittings for the connections conducting air. The housing encloses a bank of heat exchanger tubes and comprises a passage for the air to be cooled between the connecting fittings of the air. The direction of flow of the air is perpendicular to the direction of the coolant-conducting heat exchanger tubes. The cover element is implemented as a collector as well as with connecting fittings for the coolant.

DE 102009055 715 A1 discloses a suction tube with integrated charge air cooler. The suction tube comprises a housing with a first housing part and a second housing part connected thereto. The charge air flows across an inlet into the housing and out of the housing across an outlet. Except for passages for through-conducting a coolant, the charge air cooler is completely encompassed by the housing. Through the charge air cooler flows the charge air. The charge air cooler is resiliently stayed with respect to the housing.

The charge air coolers or off-gas coolers, known in prior art are highly complex and include a multiplicity of components, for example punched parts, such that in particular the heat exchanger core is often very difficult of fabrication, especially of soldering. The conventional coolers are, furthermore, fixed in terms of disposition of connections, in particular for the coolant, and cannot be varied.

The invention addresses the task of providing a device for the efficient heat transfer between two fluids, in particular between a liquid fluid as the coolant and air. With the most compact heat exchanger possible a maximal thermal capacity at minimal overall size or at minimal installation space requirement is to be transferable. The heat exchanger to be implemented of a minimal number of components is to be simple of assembly or mounting and exhibit broad variability in the disposition of the connections in order to be readily adaptable to the particular application site. The fluids are intended to experience the least possible pressure loss during their flow through the heat exchanger. The heat exchanger, furthermore, is to be of minimal weight as well as require minimal production and material costs.

The task is resolved through the subject matters with the characteristics described herein.

SUMMARY OF THE INVENTION

The task is resolved through a first device according to the invention, in particular for application in a passenger car, for the heat transfer between a first fluid and a second fluid. The device comprises a housing with a first housing element and a second housing element as well as a heat transfer element, and a second housing element as well as with a heat transfer element. The housing is implemented with a first connecting fitting and a second connecting fitting for each fluid. The heat transfer element implemented for the through-conduction of the first fluid is disposed in a volume completely enclosed by the enclosed housing. The housing is thereby implemented for conducting the second fluid about the heat transfer element.

According to the concept of the invention, the connecting fittings for the second fluid are disposed on the first housing element and the connecting fittings for the first fluid are disposed on the second housing element. Within the second housing element at least one flow path for the conduction of the first fluid is developed within the second housing element. The at least one flow path extends between a connecting fitting and a collector region.

The task is also resolved through a device according to the invention for the heat transfer between a first fluid and a second fluid, in which the connecting fittings for the fluids, specifically for the first fluid and the second fluid, are disposed on the first housing element.

According to the invention, the housing elements are developed as a unitary element with the connecting fittings. The connecting fittings, consequently, represent in each instance a component of a housing element. The housing elements are advantageously fabricated of a synthetic material, preferably as an injection molded part or of a metal, in particular of an aluminum material.

As the first fluid preferably a coolant, for example water or a mixture of glycol and water, is employed, while as the second fluid air is considered, for example a waste or off-gas of a combustion engine or charge air. In the specific case the heat transfer element can be a coolant-air heat exchanger, in particular a coolant-cooled charge-air cooler.

The term "coolant" herein does not refer to the exclusive heat transfer to the coolant, meaning a "cooling" of the second fluid. The heat transfer is also to be possible from the coolant to the second fluid.

According to a further development of the invention, the at least one flow path developed within the second housing element extends in a plane spanned by the second housing element as well as in a direction of the plane. The second housing element is herein preferably developed as a flat and substantially planar cover element.

The at least one flow path developed within the second housing element advantageously has, between the connecting fitting and the collector region, a flow cross section that is fully closed over the entire periphery.

According to a preferred embodiment of the invention, the first housing element is developed in the form of a tub with two longitudinal sides, two end sides connecting the longitudinal sides at the end regions, and a bottom. The first housing element advantageously has a rectangular cross section.

A particular advantage of the invention comprises that the heat transfer element within a volume enclosed by the first housing element is disposed such that it is oriented in a longitudinal direction and extends from the first end side up to the second end side of the first housing element.

According to a further advantageous embodiment of the invention, the heat transfer element is developed of adjacent and spaced-apart tubes and side wall members with passage apertures for receiving the tubes. The form of the passage apertures and the outer form of the tubes correspond to one another. In addition, each tube is disposed such that it is guided with a first end through a passage aperture developed in a first side wall member and with a second end is guided through a passage aperture developed in a second side wall member and is connected solidly and fluid-tight with the side wall member.

The solid connection of the side wall members with the tubes is to be understood as a technically tight, zero-leakage connection such that between the tubes and the particular side wall member no additional sealing parts need to be implemented.

The tubes are advantageously straight-line tubes. The tubes of the heat transfer element can, furthermore, be developed as flat tubes.

According to an alternative embodiment of the invention, the heat transfer element comprises adjacent and spaced-apart plates such that the heat transfer element is developed as a plate heat exchanger.

According to a further development of the invention, on a first longitudinal side of the first housing element a first connecting fitting is developed as an inlet and on a second longitudinal side of the first housing element a second connecting fitting is developed as an outlet for the second fluid. Alternatively, on a first end side of the first housing element a first connecting fitting can be provided as an inlet and on a second end side of the first housing element a second connecting fitting can be provided as an outlet for the second fluid.

According to a first alternative embodiment of the invention, on a first end side of the first housing element a first connecting fitting is developed as an inlet and on a second end side of the first housing element a second connecting fitting is developed as an outlet for the first fluid.

According to a second alternative embodiment of the invention, on a first end side of the first housing element a first connecting fitting is provided as an inlet as well as also a second connecting fitting as an outlet for the first fluid.

According to a further development of the invention, the side wall members are each developed in the form of a rectangular sheet of a metal, in particular of an aluminum material. As sheet is herein understood a flat finished rolling mill product. It is, in addition, advantageous to develop the tubes of the heat transfer element also of a metal, in particular of an aluminum material such that the side wall members are connected by soldering in each instance permanently and fluid-tight with the tubes. The side wall members are preferably disposed such that they are oriented perpendicularly to the tubes.

The side wall members advantageously have trapezoidal areas tapering toward the bottom of the first housing element.

At an encompassing edge the side wall members comprise a sealing part developed peripherally for sealing the side wall member against the housing.

According to a preferred embodiment of the invention, the first side wall member of the heat transfer element is disposed in the proximity of the first end side of the first housing element and the second side wall member of the heat transfer element is disposed in the proximity of the second end side of the first housing element. Between the first side wall member and the housing as well as between the second side wall member and the housing in each instance a volume for a first collector region and a second collector region for the first fluid is developed. The open first ends of the tubes open out into the first collector region and the open second ends of the tubes open out into the second collector region.

The first collector region is advantageously developed between a first end side of the first housing element and the first side wall member of the heat transfer element, while the second collector region is developed between a second end side of the first housing element and the second side wall member of the heat transfer element.

According to a further development of the invention, at least within one volume enclosed as collector region at least one guide part is disposed for the purpose of subdividing the volume as well as for the specific conduction of the first fluid. The guide part is herein integrated into the housing element or disposed on the housing element. The collector region provided with a guide part can serve as a diversion region or be developed with inlet and outlet, spaced apart from one another, for the first fluid as well as be developed for a multi-row flow-through of the heat transfer element. A guide part prevents for example a short-circuit flow of the fluid between the inlet and the outlet of the fluid.

The at least one guide part is advantageously disposed between the side wall member of the heat transfer element and an inner surface of an end side of the first housing element or of the second housing element, respectively.

The flow through the heat transfer element is advantageously a single-row or multi-row, in particular two-row, flow and the heat transfer element is scalable in its dimensions, such as length, width and/or height.

A further advantageous embodiment of the invention comprises that in interspaces of adjacently disposed flat tubes, members are disposed for varying the flow cross section and/or for enlarging the area for heat transfer, wherein the members are developed of a synthetic material or of a metal, in particular of an aluminum material.

According to a further preferred embodiment of the invention, the housing includes recesses for receiving the side wall members of the heat transfer element. The recesses are advantageously implemented in the first housing element as well as also in the second housing element.

The side wall members are preferably developed with a sealing part peripherally encompassing the side wall members at their peripheral edge, each of which sealing part being disposed in a recess of the housing.

The task is moreover resolved through a second device according to the invention for the heat transfer between a first fluid and a second fluid, in particular for application in a passenger car. The device comprises a housing with volumes for through-conducting the first and the second fluid, at least two side wall members as well as a multiplicity of tubes. The side wall members divide the volumes of the housing into first volumes and a second volume. The tubes extend between the first volumes and form flow paths for conducting the first fluid.

According to the concept of the invention, a multiplicity of passage apertures, in particular for receiving tubes, is provided in the trapezoidal side wall members.

The housing advantageously comprises a first housing element and a second housing element.

According to a further development of the invention, the housing is developed, for one, with a first connecting fitting and a second connecting fitting, which are connected with a volume for the first fluid. The housing, for another, comprises a first connecting fitting and a second connecting fitting which are connected with a volume for the second fluid.

A special advantage of the invention comprises that the connecting fittings for the second fluid are disposed on the first housing element and the connecting fittings for the first fluid are disposed on the second housing element.

The housing is preferably developed with recesses for receiving the side wall members.

According to a preferred embodiment of the invention, within the second housing element at least one flow path for the conduction of the first fluid is developed.

A further advantage of the invention comprises that the housing elements are each developed with a support surface for placing the housing elements next to one another. The support surface of the first housing element preferably comprises a peripheral groove for receiving a sealing part. The sealing part is disposed between the adjacently disposed housing elements.

The heat transfer element, advantageously operable in pure cross flow or pure counterflow or in a combination of cross flow and counterflow, can, according to an embodiment of the invention, be integrated in a coolant circulation.

In summary, the devices according to the invention for heat transfer, in particular a coolant-cooled charge air cooler, comprise diverse advantages:

efficient heat transfer between two fluids, in particular between a liquid fluid as coolant and air, transfer of maximal thermal capacity at minimal manufactured size or minimal installation space requirement, which means at optimal ratio of transferable thermal capacity to physical volume, wherein the reutilization or continued utilization of known components is feasible, high compactness of design and high impermeability between the fluid flows, minimal number of components, minimal costs of production and minimal material expenditures also due to use of standard flat tube profiles, high corrosion resistance, in particular when using a housing developed of a synthetic material, minimal weight and wide variability in the disposition of the fittings integrated on the housing, in particular of those of the first fluid, simple assembly and/or mounting of the device and simple connection of individual components of the heat transfer element by soldering within a soldering furnace in one process step if the components and parts are implemented of a metal, in particular of an aluminum material.

Further details, characteristics and advantages of embodiments of the invention will be evident based on the following description of embodiment examples with reference to the associated drawing.

DETAILED DESCRIPTION

Figure 1A:
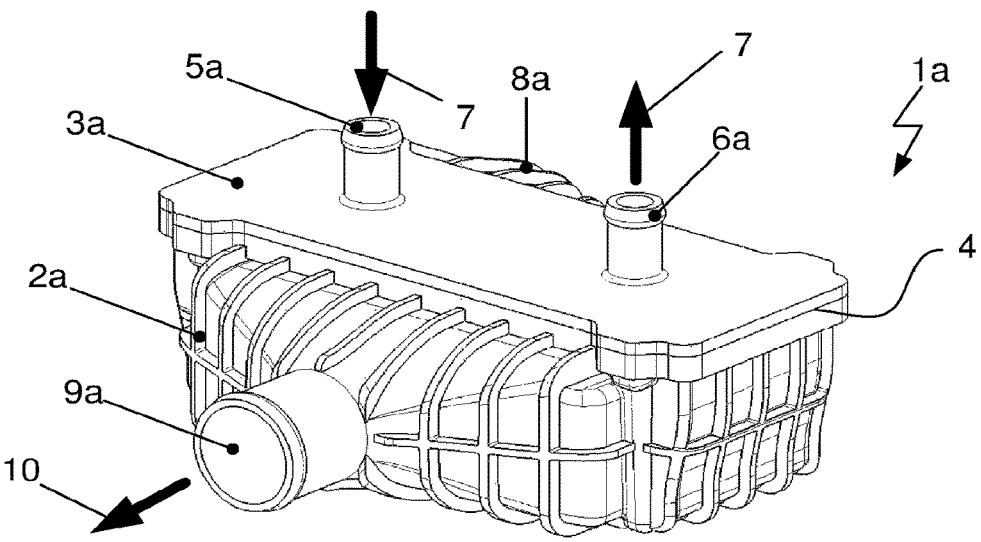
FIG. 1A to 1E: a first embodiment of the device with a two-part housing of a first housing element and a second housing element with connecting fittings for the first fluid as well as a heat transfer element in different views.

FIG. 1A to 1F depict each a first embodiment of the device 1a with a two-part housing with a first housing element 2a and a second housing element 3a with connecting fittings 5a, 6a for the first fluid as well as with a heat transfer element 11a in different views.

In FIG. 1A is shown the device 1a in a closed state. The not depicted heat transfer element is disposed within the tub-shaped first housing element 2a and within the closed housing. The second housing element 3a, developed as a cover element, in particular developed with a flange on the first housing element 2a, corresponding with the first housing element 2a comprises a first connecting fitting 5a as an inlet and a second connecting fitting 6a as an outlet for the first fluid. The second housing element 3a having substantially the form of a flat plate, is oriented with a first side toward the first housing element 2a. The connecting fittings 5a, 6a are implemented on a second side oriented away from the first housing element 2a. The first fluid, in particular a coolant, for example a water-glycol mixture, is introduced in the direction of flow 7 through the first connecting fitting 5a into the device 1a and flows out of the device 1a again through the second connecting fitting 6a. The connecting fittings 5a, 6a can be positioned at any site on the upper side of the second housing element 3a.

The first housing element 2a comprises a first connecting fitting 8a as an inlet and a second connecting fitting 9a as an outlet for the second fluid. The connecting fittings 8a, 9a are each developed on a longitudinal side of the first housing element 2a, which, together with the two longitudinal sides and two end sides connecting the two longitudinal sides at the ends, has a substantially rectangular cross section. The second fluid, in particular air, for example a charge air flow or a waste/exhaust flow, is introduced in the direction of flow 10 through the first connecting fitting 8a into the device 1a and flows through the second connecting fitting 9a out of the device 1a again.

The housing elements 2a, 3a are developed with the respective connecting fittings 5a, 6a, 8a, 9a as a unitary element. The housing elements 2a, 3a can advantageously be implemented of a synthetic material as an injection molded part with integrated connecting fittings 5a, 6a, 8a, 9a. Because of the unitary implementation of the housing elements 2a, 3a and the connecting fittings 5a, 6a, 8a, 9a, utilization of additional sealing parts that increase the risk of leakages and lead to additional costs in the production and maintenance of the device 1a is avoided.

The pipes, for example coolant pipes of a coolant circulation, for conducting the first fluid can herein be connected to the device 1a, or the direction of flow 7 of the first fluid can be oriented, such that the inlet 5a and the outlet 6a for the first fluid are each supplied in the reverse direction of flow 7 and the inlet 5a as well as the outlet 6a are interchanged. The pipes for conducting the second fluid, for example air pipes, can be connected to the device 1a, or the direction of flow 10 of the second fluid can be oriented such that the inlet 8a and the outlet 9a for the second fluid are each supplied in the reverse flow direction 10 and the inlet 8a as well as the outlet 9a are interchanged.

The housing elements 2a, 3a, preferably implemented of a synthetic material and in contact on one another on a support surface 4 such that they are impermeable to fluids, can, for example, be connected with one another by welding or adhesion under material closure, under force closure by bolting or under form closure by serial snap-fastening. Between the housing elements 2a, 3a at least one not depicted sealing part can be disposed.

Figure 1B:
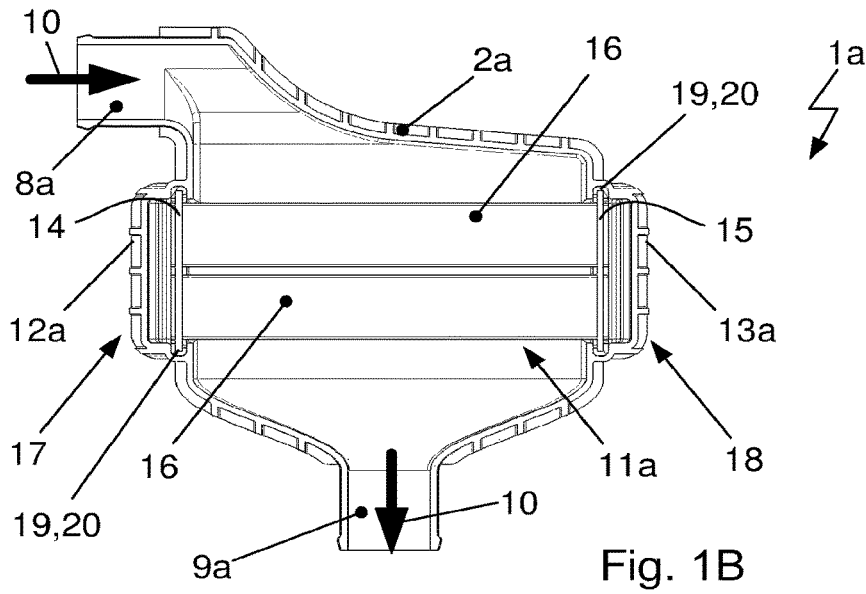
Figure 1C:
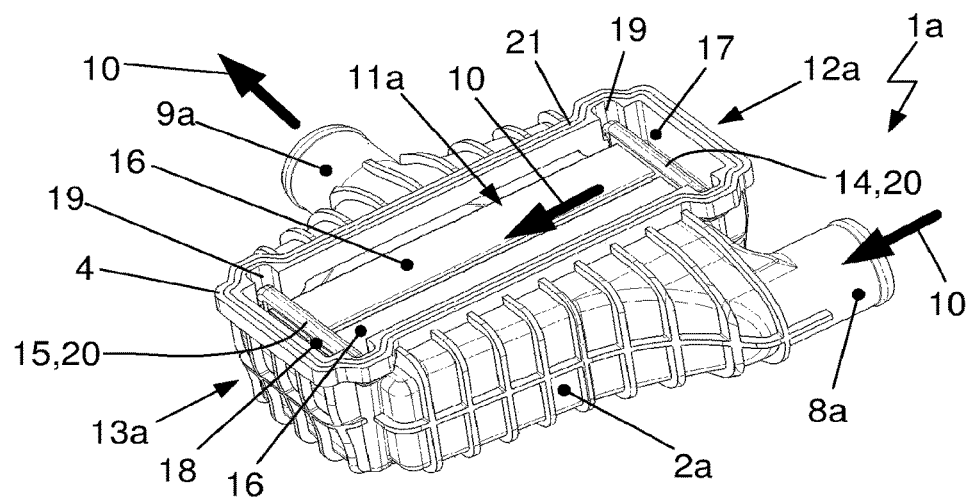

In FIG. 1B is shown the device 1a in a sectional representation through a central plane, oriented horizontally, of the first housing element 2a with a heat transfer element 11a, while the device 1a is depicted in FIG. 1C in an opened state and thus without the second housing element 3a.

The heat transfer element 11a is oriented so as to extend with a multiplicity of flat tubes 16 in a longitudinal direction from a first end side 12a to a second end side 13a of the first housing element 2a. A first side wall member 14 of the heat transfer element 11a is disposed in the proximity of the first end side 12a of the first housing element 2a and a second side wall member 15 of the heat transfer element 11a is disposed in the proximity of the second end side 13a of the first housing element 2a.

First ends of the flat tubes 16 are guided through passage apertures developed in the first side wall member 14 and second ends of the flat tubes 16 are guided through passage apertures developed in the second side wall member 15. The flat tubes 16 are each permanently connected with the side wall members 14, 15. With the implementation of the side wall members 14, 15 and the flat tubes 16 of aluminum, the components are soldered to one another. The side wall members 14, 15 and the outer sides of the flat tubes 16 are connected with one another under fluidic impermeability.

The second fluid, introduced in the direction of flow 10 through the inlet 8a into the device 1a is conducted in the region between the side wall members 14, 15 through the interspaces developed between tubes 16 disposed proximate to one another as well as between the flat tubes 16 and the inner side of the housing, and therewith across the outer sides of the flat tubes 16 and flows through the outlet 9a out of the device 1a. The second fluid flows about the flat tubes 16.

The first fluid, introduced in the direction of flow 7 through the inlet 5a into the device 1a, is routed into a first collector region 17. In the collector region 17 the mass flow of the first fluid is distributed for its throughflow through the flat tubes 16 as mass subflows to flow through the flat tubes 16. The mass subflows of the first fluid flow out of the flat tubes 16 into a second collector region 18 and are mixed with one another such that the first fluid flows out of the device 1a through the outlet 6a. The first fluid is conducted through the flat tubes.

The first fluid is consequently routed through the device 1a substantially in cross flow with the second fluid. The device 1a is advantageously operated as a cross-counterflow heat exchanger.

The collector regions 17, 18 for the first fluid are each implemented in the proximity of the end sides 12a, 13a of the first housing element 2a, between the end sides 12a, 13a as wall of the housing and the side wall members 14, 15 of the heat transfer element 11a. The side wall members 14, 15 delimit the collector regions 17, 18 toward the interior of the volume enclosed by the housing.

The side wall members 14, 15 of the heat transfer element 11a are herein each disposed in the recesses 19 of the housing. Within the recesses 19 are disposed sealing parts 20 between the wall of the housing and the side edges of the side wall members 14, 15, encompassing the side wall members 14, 15 over the entire periphery, such that the first fluid flowing into the collector region 17, 18 and the second fluid flowing through between the side wall members 14, 15 are separated from one another. The recesses 19 and the side edges of the side wall members 14, 15 with the sealing parts 20 correspond to one another.

The not depicted second housing element 3a, to be placed onto the support surface 4 of the first housing element 2a, is also developed with recesses for receiving the side wall members 14, 15 with the sealing parts 20. The support surface 4 of the first housing element 2a comprises, in addition, a peripheral groove with a further sealing part 21. When placing the second housing element 3a onto the first housing element 2a, 3a, for one, the housing elements are sealed fluid-tight with respect to one another and, for another, the side wall members 14, 15 with the sealing parts 20 are sealed fluid-tight with respect to the second housing element 3a.

Figure 1D:
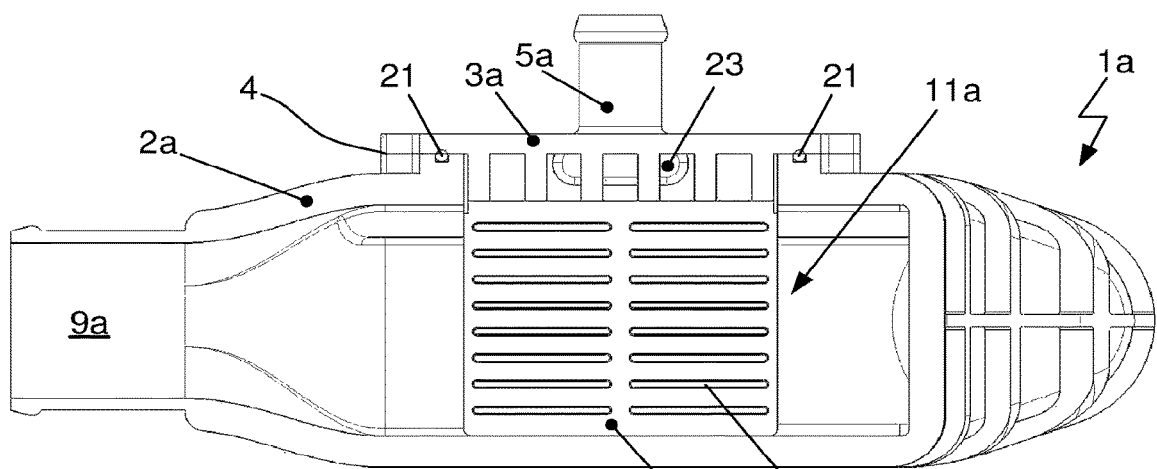

FIG. 1D shows the device 1a in sectional representation through a central, vertically oriented plane with the heat transfer element 11a. The second fluid flows orthogonally to the flat tubes 16 through the interspaces developed between the flat tubes 16 and through the outlet 9a out of the housing, in particular out of the first housing element 2a. The first fluid is introduced through the inlet 5a into the second housing element 3a and flows through the flow paths 23, developed in housing element 3a, to the first, not depicted, collector region 17. The flow paths 23 extend from the inlet 5a up to the first collector region 17 and are each developed with flow cross sections that are closed over the full periphery.

In the region of the support surface 4 the second housing element 3a and the first housing element 2a are in contact on one another. Between the housing elements 2a, 3a the sealing part 21 is disposed. The housing elements 2a, 3a which, in the assembled state, fully enclose a volume, and the side wall members 14, 15 can be simply plugged together and connected with one another.

Figure 1E:
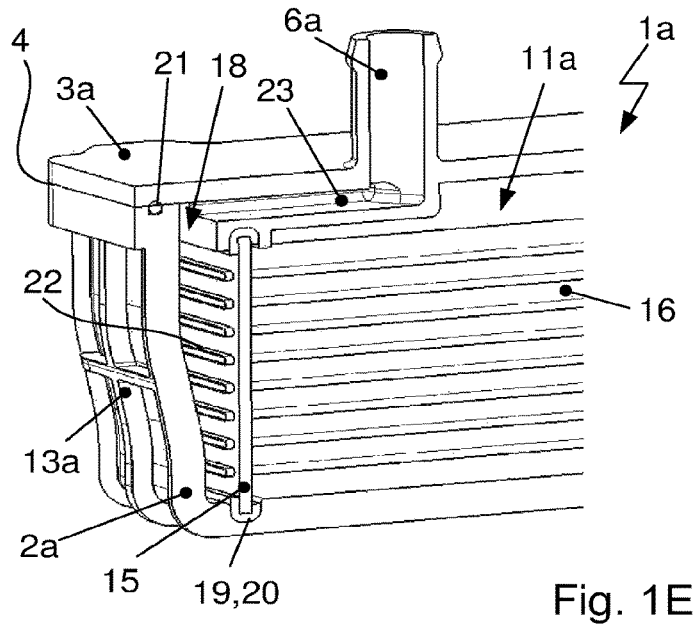

FIG. 1E shows a detail view of the second collector region 18, of the second side wall member 15 and of a flow path 23 developed within the second housing element 3a.

Side wall members 14, 15 are each developed in the form of a substantially rectangular metal sheet, in particular of aluminum, and can be produced by punching. The side wall members 14, 15, rounded in the proximity of the corners, comprise passage apertures 22 for receiving the flat tubes 16 of the heat transfer element 11a. The cross sections of the passage apertures 22 correspond to the outer dimensions of the flat tubes 16 in order to establish, for example by soldering, the fluid-tight connection between the individual flat tubes 16 and the side wall members 14, 15. Each of the flat tubes 16 opens out into the collector region 17, 18.

The flow paths 23 developed within the second housing element 3a are disposed such that they connect a collector region 17, 18 with a connecting fitting 5a, 6a.

Figure 1F:
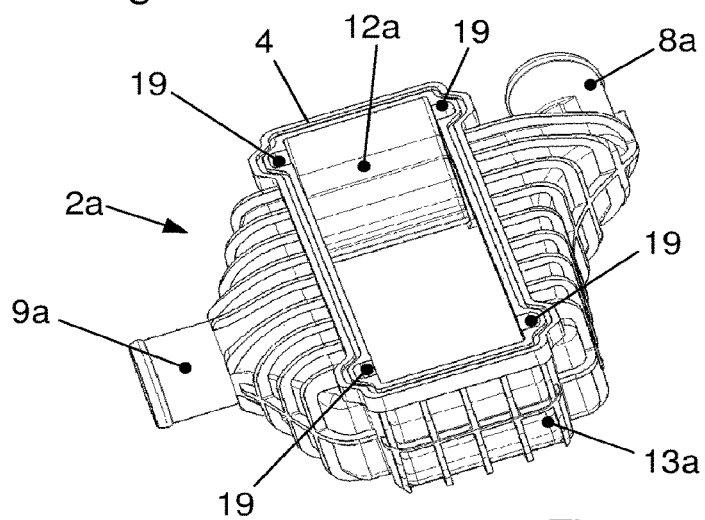
FIGS. 1F and 1G: the first housing element and the second housing element in perspective view.
Figure 1G:
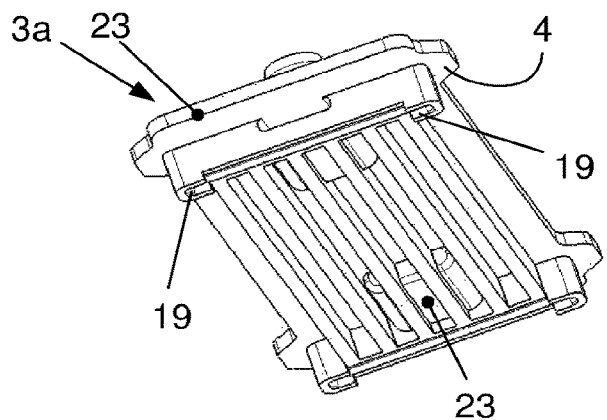

FIGS. 1F and 1G depict the first housing element 2a and, respectively, the second housing element 3a with the support surfaces 4, each in perspective view. Herein are shown especially clearly the corresponding recesses 19 for receiving the side wall members 14, 15 of the heat transfer element 11a.

Figure 1H:
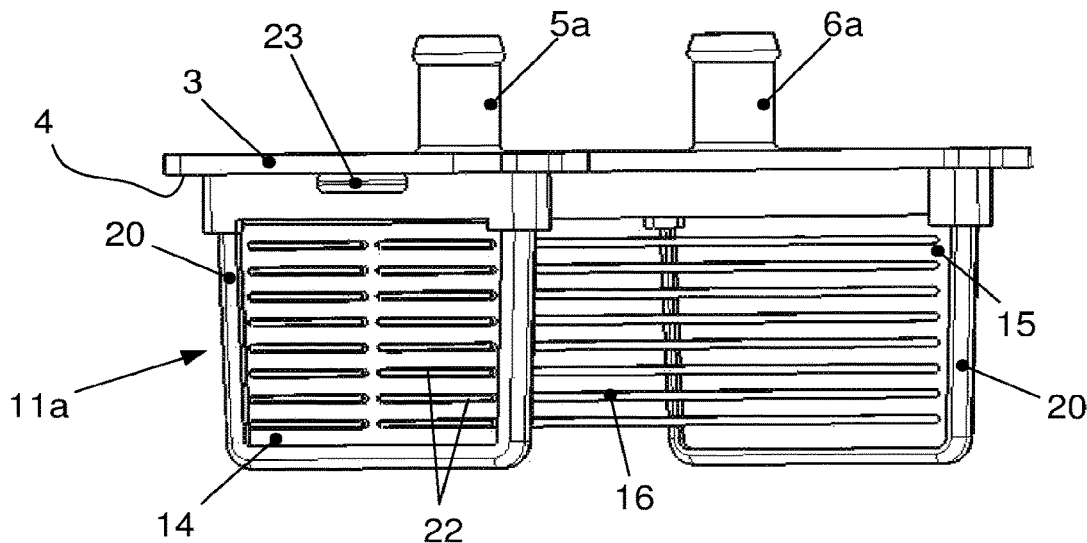
FIG. 1H: the heat transfer element in combination with the second housing element in perspective view.
Figure 2:
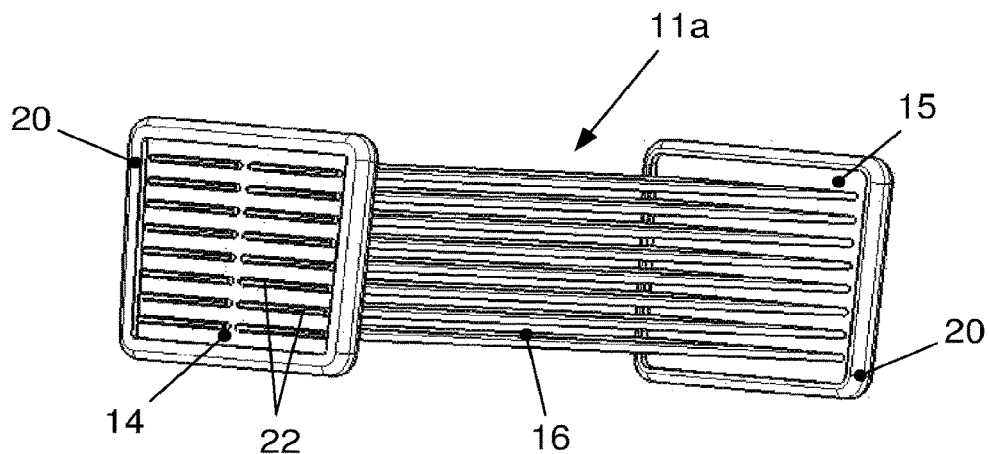
FIG. 2: the heat transfer element in perspective view.

FIG. 1H depicts the heat transfer element 11a in combination with the second housing element 3a and FIG. 2 depicts the heat transfer element 11a, each in perspective view.

The heat transfer element 11a developed from the flat tubes 16 as extruded flat tube heat exchanger is developed as a single-row or multi-row heat exchanger depending on the capacity requirements and is scalable in terms of size, that is in particular in length or width. The heat transfer element 11a depicted in FIGS. 1h and 2 is developed in two rows.

The flat tubes 16 oriented in two parallel rows next to one another and in parallel with each other, are disposed within each row with their broad sides toward one another, such that between directly adjacent flat tubes 16 in each instance a flow path for the second fluid, in particular for air, is generated. The flow path extends herein between flat tubes 16 of the first row and subsequently between flat tubes 16 of the second row. The flat tubes 16 of the first and the second row are flush with one another and extend in each instance between the two side wall members 14, 15 or between the two collector regions 17, 18. The inner volumes of the flat tubes 16 are connected with the inner volumes of the collector regions 17, 18 as well as with the flow paths 23 of the second housing element 3a.

In the flow paths, and therewith in the interspaces of adjacently disposed flat tubes 16, furthermore, not depicted members can be disposed for varying the flow cross section and/or the enlargement of the surface for heat transfer. As members for varying the flow cross section and/or the enlargement of the surface for heat transfer are applicable fins for conditioning air. Alternatively, webs could also be employed. The members are developed, for example, of a material with good thermal conductivity such as aluminum, or of a synthetic material or another material with low density.

The side wall members 14, 15 are herein soldered to the flat tubes 16. They can however also be adhered or welded to one another. The permanent connection is to be viewed as a technically tight, zero-leakage connection such that between the side wall members 14, 15 and the flat tubes 16 no sealing sites need to be implemented. The side wall members 14, 15 are disposed on the narrow sides of the flat tubes 13 and are oriented perpendicularly to the flat tubes 16 and, to facilitate the emplacement and sealing of the heat transfer element 11a into the housing elements 2a, 3a, have trapezoidal side faces. The trapezoidal side faces taper toward the bottom of the first housing element 2a.

The side wall members 14, 15 are each provided with the encompassing sealing part 20 and, according to FIG. 1h, are connected with the broader side face within the recess 19 with the second housing element 3a.

The heat transfer element 11a is developed so as to be symmetric with the side wall members 14, 15 and the flat tubes 16.

Figure 3A:
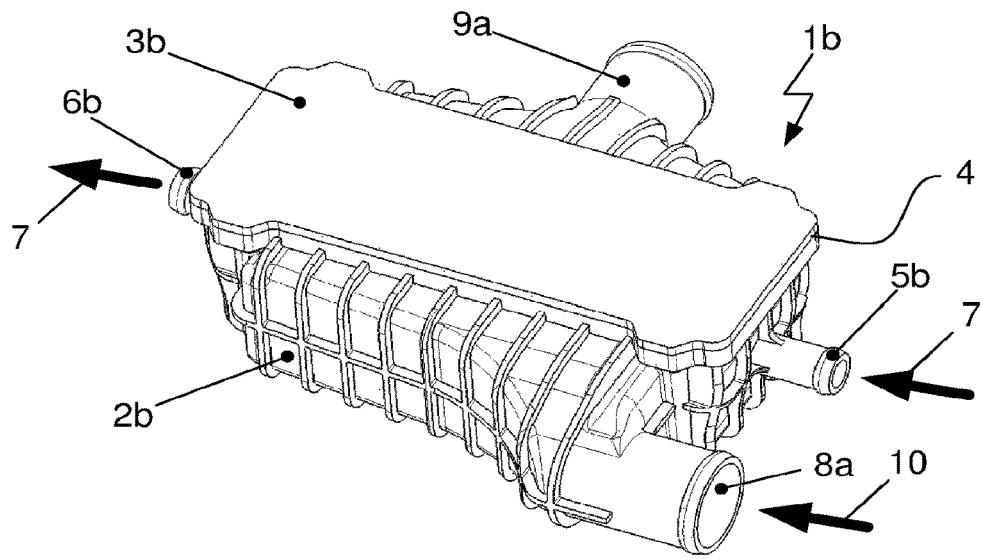
FIG. 3A to 3C: a second embodiment of the device with a two-part housing of a first housing element with connecting fittings for the first fluid and a second housing element as well as the heat transfer element in different views.
Figure 3B:
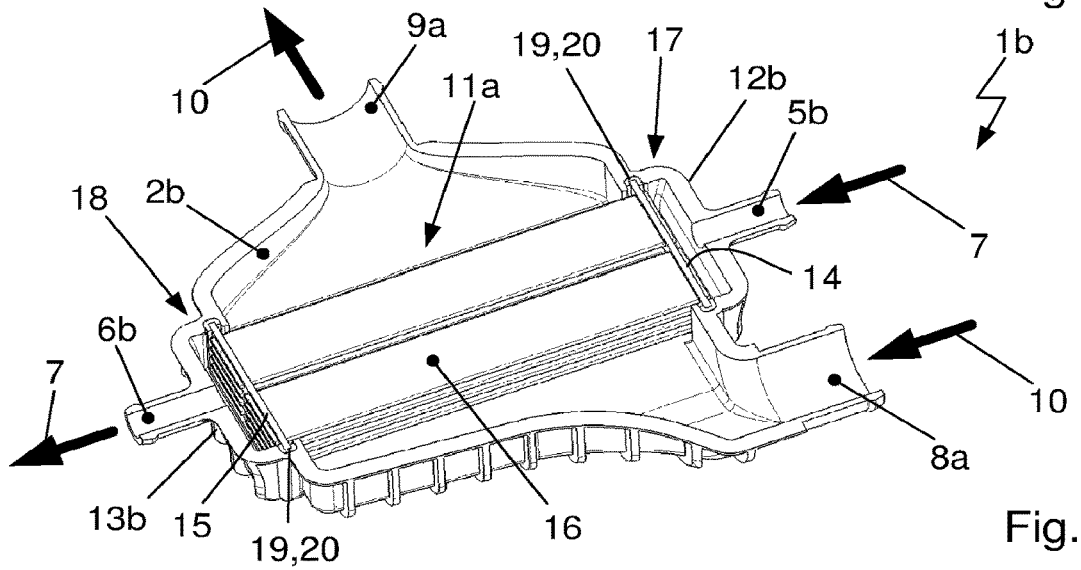
Figure 3C:
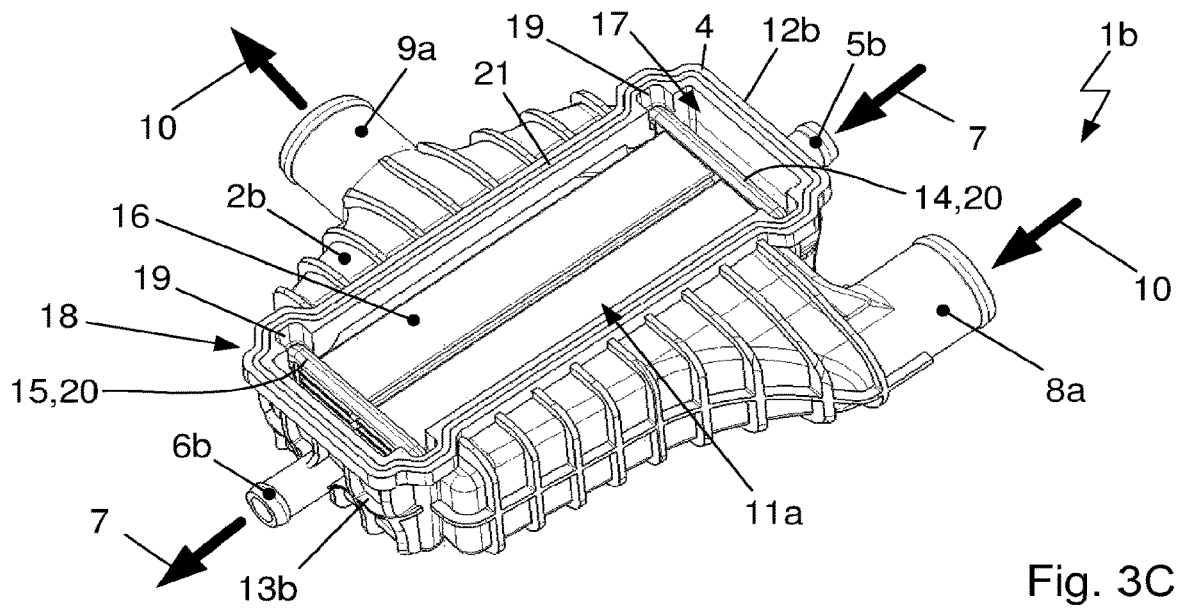

In each of FIG. 3A to 3C is shown in different views a second embodiment of the device 1b with a two-part housing comprised of a first housing element 2b and a second housing element 3b with connecting fittings 5b, 6b for the first fluid as well as with a heat transfer element 11a.

The differences between them and the first embodiment of device 1a according to FIG. 1a to 1 h lie in the implementation of the first housing elements 2a, 2b and the second housing elements 3a, 3b, in particular in the implementation of the connecting fittings 5a, 5b, 6a, 6b of the first fluid. In the case of same implementation of the characteristics, reference is made to explanations in connection with the device from FIG. 1a to 1h.

In FIG. 3A is evident the device 1b in a closed state, wherein the not depicted heat transfer element is disposed within the housing of the tub-shaped first housing element 2b and within the closed housing.

In FIG. 3B is shown the device 1b in a sectional representation through a central, horizontally oriented plane of the first housing element 2b with the heat transfer element 11a, while the device 1b in FIG. 3C is depicted in an opened state and thus without the second housing element 3b.

The heat transfer elements of the devices 1a, 1b are identical. The second housing element 3b, developed as a cover element, corresponding with the first housing element 2b, in particular with a flange implemented on the first housing element 2b, is substantially developed as a planar plate without connecting fittings and flow paths for the first fluid, however with recesses 19 for receiving the side wall members 14, 15 of the heat transfer element 11a.

In addition to the first connecting fitting 8a as an inlet and the second connecting fitting 9a as an outlet for the second fluid, which are developed on a longitudinal side of the first housing element 2b, the first housing element 2b comprises also a first connecting fitting 5b as an inlet and a second connecting fitting 6b as an outlet for the first fluid. The first connecting fitting 5b and the second connecting fitting 6b for the first fluid are each developed on an end side 12b, 13b. The first fluid is introduced in the direction of flow 7 through the first connecting fitting 5b into the device 1b and flows through the second connecting fitting 6b out of the device 1b again.

The connecting fittings 5b, 6b disposed on an end side 12b, 13b are herein connected directly with a collector region 17, 18, which is especially evident in FIGS. 3b and 3c. The first housing element 2b is developed with the connecting fittings 5b, 6b, 8a, 9a as a unitary element, advantageously of a synthetic material as an injection molded part.

The first fluid, introduced in the direction of flow 7 through inlet 5b directly into the first collector region 17, for its throughflow through the flat tubes 16 is distributed in mass subflows through the flat tubes 16. The mass subflows of the first fluid flow out of the flat tubes 16 into the second collector region 18 and are mixed with one another and led off directly through the outlet 6b out of device 1b.

In FIG. 4A to 4D is shown in each instance a third embodiment of the device 1c with a two-part housing comprised of a first housing element 2c and a second housing element 3c with connecting fittings 5c, 6c for the first fluid as well as of a heat transfer element 11c in different views.

The differences between this embodiment and the second embodiment of device 1b according to FIGS. 3a to 3c lie in the implementation of the first housing elements 2b, 2c, in particular in the implementation of the connecting fittings 5b, 5c, 6b, 6c of the first fluid. In the case of same implementation of the characteristics, reference is made to the explanations in connection with device 1b of FIGS. 3a to 3c.

Figure 4A:
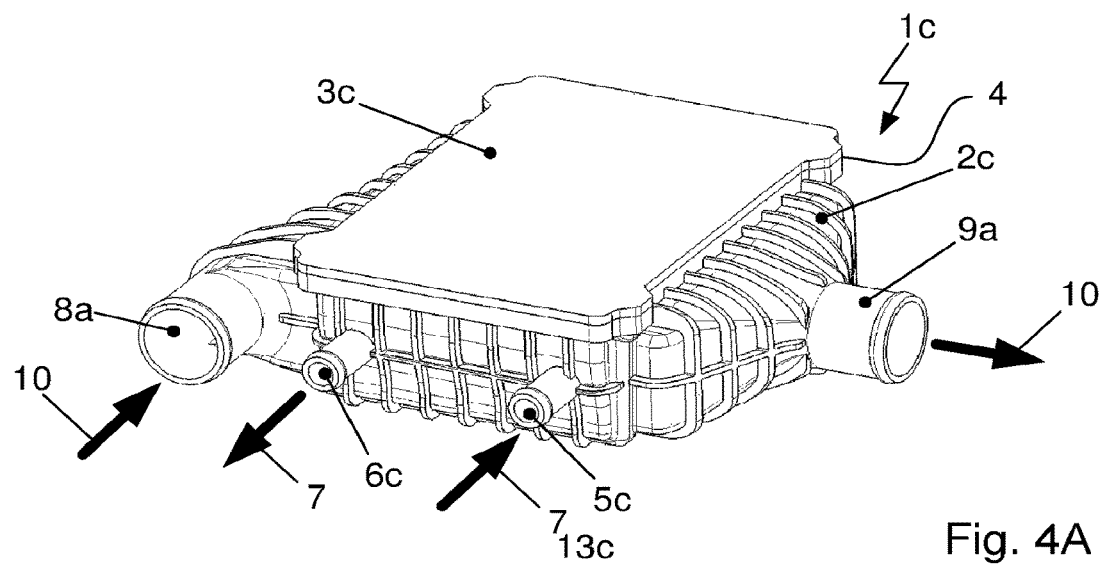
FIG. 4A to 4D: a third embodiment of the device with a two-part housing of a first housing element with connecting fittings for the first fluid and a second housing element as well as a heat transfer element in different views.
Figure 4B:
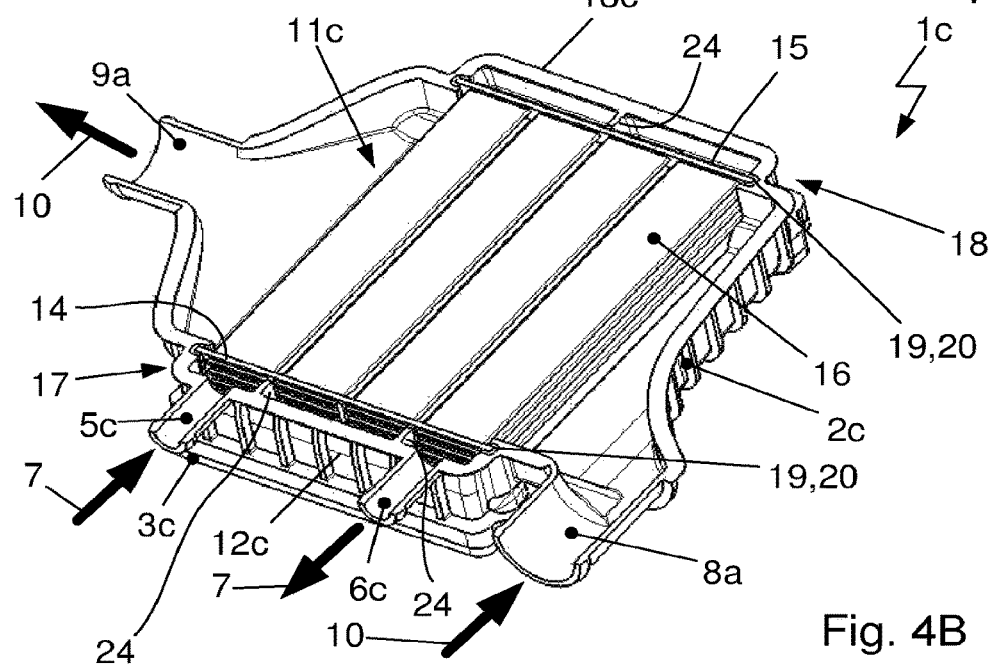
Figure 4C:
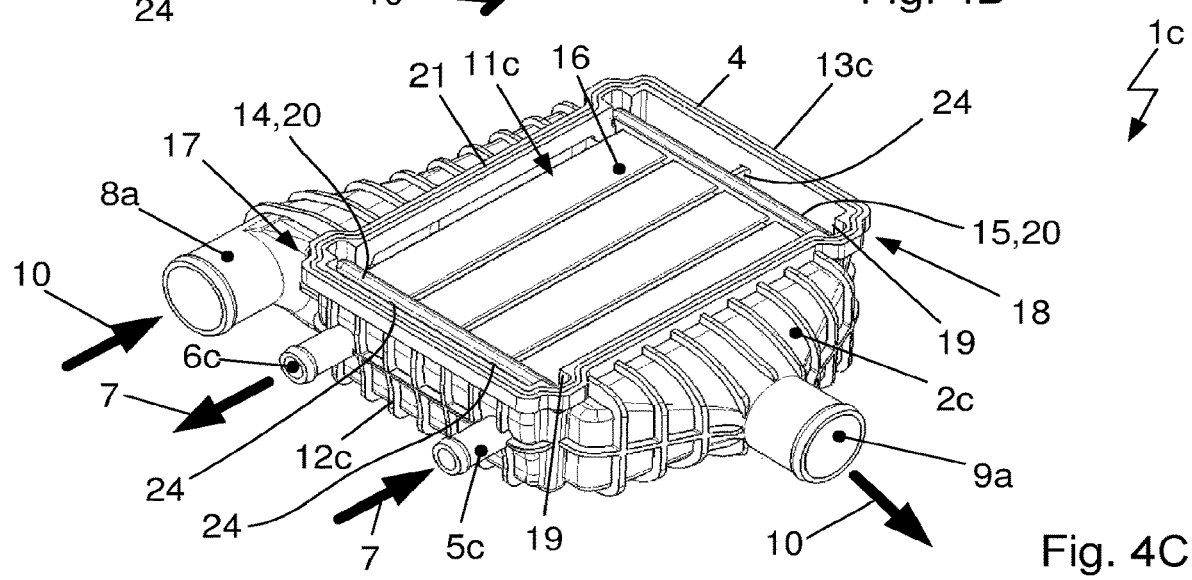
Figure 4D:
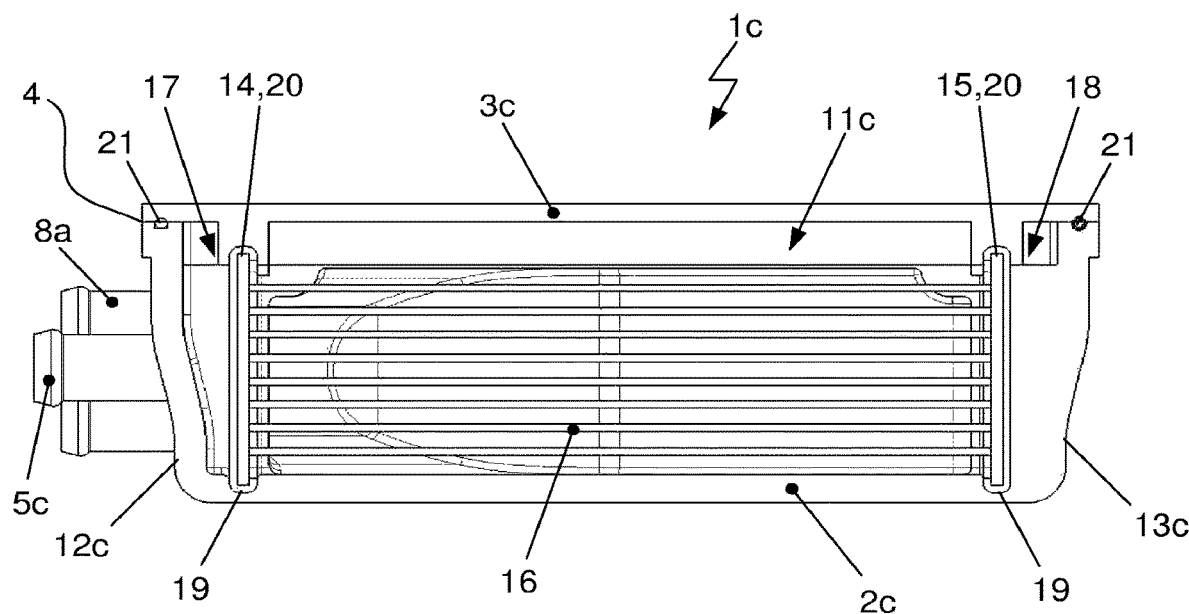

FIG. 4A depicts the device 1c in a closed state, wherein the not depicted heat transfer element is disposed within the tub-shaped first housing element 2c and within the housing. In FIG. 4B the device 1c is shown in a sectional representation through a central, horizontally oriented plane of the first housing element 2c with the heat transfer element 11c, while the device 1c in FIG. 4C is shown in an opened state and thus without the second housing element 3c. In FIG. 4D is evident a sectional representation of the device 1c.

In addition to the first connecting fitting 8a as an inlet and the second connecting fitting 9a as an outlet for the second fluid, which are in each instance developed on a longitudinal side of the first housing element 2c, the first housing element 2c comprises also a first connecting fitting 5c as an inlet and a second connecting fitting 6c as an outlet for the first fluid. The first connecting fitting 5c and the second connecting fitting 6c for the first fluid are developed on the first end side 12c. The second end side 13c does not comprise any connecting fitting. The first fluid is introduced in the direction of flow 7 through the first connecting fitting 5c into the device 1c and flows through the second connecting fitting 6c out of the device 1c again.

The connecting fittings 5c, 6c disposed on the first end side 12c are directly connected with the first collector region 17, which is especially clearly shown in FIGS. 4b and 4c. The first housing element 2c is developed with the connecting fittings 5c, 6c, 8a, 9a as a unitary element advantageously of a synthetic material as an injection molded part.

Within the collector regions 17, 18, guide parts 24 are implemented which divide the volumes of the collector regions 17, 18. Within the first collector region 17 two guide parts 24 are disposed, while within the second collector region 18 one guide part 24 is provided. The guide part 24 disposed within the second collector region 18 divides the volume of collector region 18 into two regions of equal volume. The guide parts 24 disposed within the first collector region 17 divide the volume of collector region 17 into two regions of equal smaller volumes and one region with a larger volume. The smaller volumes together correspond herein approximately to the volume of the larger region.

The guide parts 24 developed between the side wall members 14, 15 of the heat transfer element 11c and the inner faces of the end sides 12c, 13c of the first housing element 2c serve for the specific conduction of the first fluid through the flat tubes 16 of the heat transfer element 11c.

The heat transfer element 11c developed from the flat tubes 16 as extruded flat tube heat exchanger is implemented as a four-row element. The flat tubes, disposed in parallel rows next to one another and oriented parallel to one another, are disposed within each row with their broad sides toward one another such that between directly adjacent flat tubes 16 in each instance a flow path for the second fluid, in particular for air, is generated. The flow path extends herein in each instance between flat tubes 16 of the first row, subsequently between flat tubes 16 of the second row, of the third row and finally of the fourth row. The flat tubes 16 of the individual rows are flush with one another and extend in each instance between the two side wall members 14, 15 or the two collector regions 17, 18. The inner volumes of the flat tubes 16 are connected with the inner volumes of the collector regions 17, 18.

The first fluid flows through the inlet 5c in the direction of flow 7 into the device 1c and is distributed in the first collector region 17, in particular in one of the smaller volumes, over the flat tubes 16 of the first row. The refrigerant subsequently flows through the flat tubes 16 to the second collector region 18 and into a first part of the divided volume of the second collector region 18, is collected and distributed over the flat tubes 16 of the second row. The first fluid flows subsequently through the flat tubes 16 of the second row back to the first collector region 17, in particular into the larger volume, is collected and distributed over the flat tubes 16 of the third row. The refrigerant subsequently flows through the flat tubes 16 again to the second collector region 18 and into a second part of the divided volume of the second collector region 18, is collected and distributed over the flat tubes 16 of the fourth row. The first fluid flows subsequently through the flat tubes 16 of the fourth row back to the first collector region 17 and into a third part of the divided volume of the first collector region 17, in particular into one of the smaller volumes, is collected and flows through outlet 6c out of the device 1c.

Figure 5:
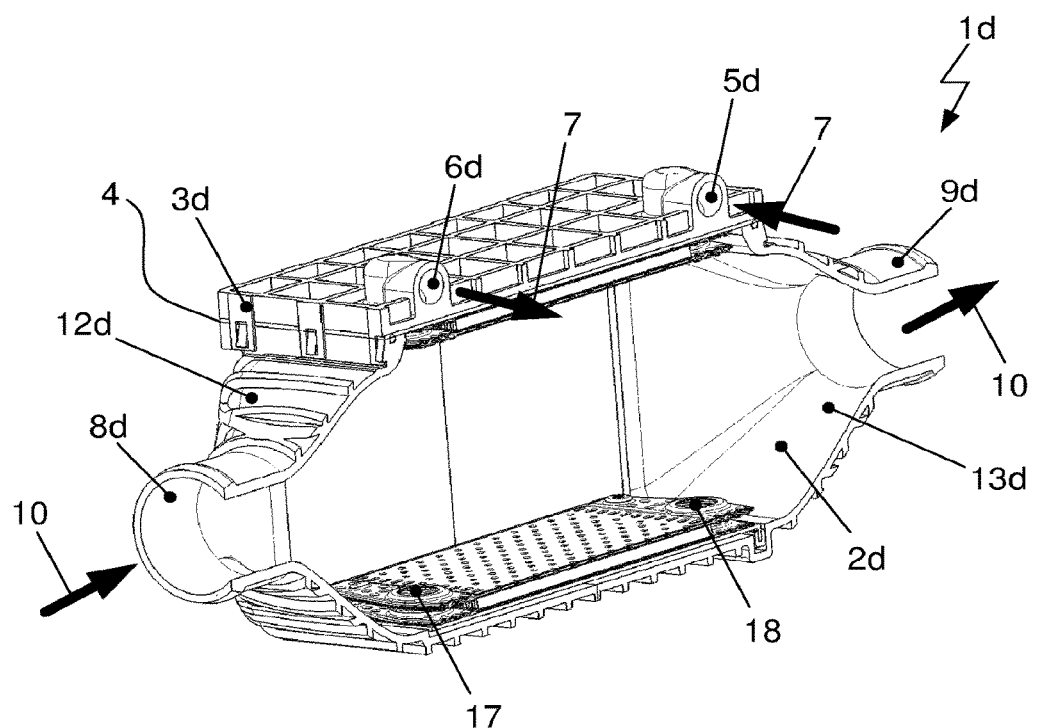
FIG. 5: a fourth embodiment of the device with a two-part housing with a first housing element and a second housing element with connecting fittings for the first fluid as well as a heat transfer element in sectional representation.

In FIG. 5 is shown in a sectional representation a fourth embodiment of the device 1d with a two-part housing comprised of a first housing element 2d and a second housing element 3d with connecting fittings 5d, 6d for the first fluid as well as a heat transfer element 11d.

The differences between this fourth embodiment and the embodiment of the device 1a according to FIGS. 1a to 1h lie in the implementation of the first housing elements 2a, 2d and the second housing elements 3a, 3d with the implementation of the connecting fittings 5a, 5d, 6a, 6d of the first fluid as well as the connecting fittings 8a, 8d, 9a, 9d of the second fluid. In the case of same implementation of the characteristics, reference is made to the explanations in connection with the device 1a of FIGS. 1a to 1h.

The first housing element 2d is divided in a center plane and is joined at the center plane during the assembly of the device 1d after the heat transfer element 11d has been emplaced. The second housing element 3d, corresponding as a cover element to the first housing element 2d, in particular with a flange developed on the first housing element 2d, comprises the first connecting fitting 5d as an inlet and the second connecting fitting 6d as an outlet for the first fluid. The second housing element 3d having substantially the form of a flat plate is oriented with a first side toward the first housing element 2d. The connecting fittings 5d, 6d are developed on a second side facing away from the first housing element 2d. The first fluid is introduced in the direction of flow 7 through the first connecting fitting 5d into the device 1d and flows through the first connecting fitting 5d into the device 1d and out of device 1d again through the second connecting fitting 6d.

The first housing element 2d comprises the first connecting fitting 8d as an inlet and the second connecting fitting 9d as an outlet for the second fluid. The connecting fittings 8d, 9d are each developed on an end side of the first housing element 2d, which, with two longitudinal sides and the two end sides connecting the two longitudinal sides at the ends, has substantially a rectangular cross section. The second fluid is introduced in the direction of flow 10 through the first connecting fitting 8d into the device 1d and flows through the second connecting fitting 9d again out of the device 1d.

The housing elements 2d, 3d are implemented with the particular connecting fittings 5d, 6d, 8d, 9d in each instance as a unitary element, advantageously of synthetic material as an injection molded part with integrated connecting fittings 5d, 6d, 8d, 9d.

The housing elements 2d, 3d fluidically impermeable in contact on one another on the support surface 4 are connected with one another under form closure, for example by peripheral snap-fixing. Between the housing elements 2d, 3d at least one not depicted sealing part can be disposed.

The heat transfer element 11d, developed as a plate heat exchanger, extends with a multiplicity of plate members in a longitudinal direction from the first end side 12d up to the second end side 13d of the first housing element 2d. The inner volumes of the plate members are connected across a first collector region 17 and a second collector region 18 with the connecting fittings 5d, 6d of the first fluid such that the first fluid is routed through the connecting fittings 5d, 6d, the collector regions 17, 18 and the plate members.

The second fluid is routed through the interspaces developed between adjacently disposed plate members as well as between the plate members and the inner side of the housing and thus across the outer sides of the plate members. The second fluid flows about the plate members.

Alternatively, the interspaces developed between the plate members disposed on the outer side and the inner side of the housing can be foamed to avoid leakages, in particular leakages of the air. The foaming of the interspaces serves for eliminating soldering tolerances.

| List of Reference Numbers | |
|---|---|
| 1a, 1b, 1c, 1d | Device |
| 2a, 2b, 2c, 2d | First housing element |
| 3a, 3b, 3c, 3d | Second housing element |
| 4 | Support surface, housing elements |
| 5a, 5b, 5c, 5d | First connecting fittings, inlet first fluid |
| 6a, 6b, 6c, 6d | Second connecting fittings, outlet first fluid |
| 7 | Direction of flow, first fluid |
| 8a, 8d | First connecting fittings, inlet second fluid |
| 9a, 9d | Second connecting fittings, outlet second fluid |
| 10 | Direction of flow, second fluid |
| 11a, 11c, 11d | Heat transfer element |
| 12a, 12b, 12c, 12d | First end side, housing |
| 13a, 13b, 13c, 13d | Second end side, housing |
| 14 | First side wall member, heat transfer element |
| 15 | Second side wall member, heat transfer element |
| 16 | Flat tube |
| 17 | First collector region, first fluid |
| 18 | Second collector region, first fluid |
| 19 | Recess, housing |
| 20 | Sealing part, side wall member 14, 15, housing element |
| 21 | Sealing part, housing elements 2, 3 |
| 22 | Passage aperture, side wall member 14, 15 |
| 23 | Flow path, first fluid |
| 24 | Guide part |

What is claimed:

1. A device for the heat transfer between a first fluid and a second fluid, comprising:
a housing with volumes for the through-conduction of the first and of the second fluid,
a multiplicity of side wall members which divide the volumes of the housing into a first volume and a second volume,
a multiplicity of tubes which extend between the first volume and develop flow paths for the conduction of the first fluid,
wherein in the side wall members a multiplicity of passage apertures are developed and the multiplicity of side wall members have trapezoidal areas tapering toward the bottom of the housing.

2. A device according to claim 1, wherein the housing comprises a first housing element and a second housing element.

3. A device according to claim 2, characterized in that the housing is developed with one first connecting fitting and a second connecting fitting which are connected with a volume for the first fluid, and the housing is developed with a first connecting fitting and a second connecting fitting which are connected with a volume for the second fluid.

4. A device according to claim 3, wherein the connecting fittings for the second fluid are disposed on the first housing element and the connecting fittings for the first fluid are disposed on the second housing element.

5. A device according to claim 1, wherein the housing is developed with recesses for receiving the side wall members.

6. A device according to claim 4, wherein within the second housing element at least one flow path is developed for conducting the first fluid.

7. A device for the heat transfer between a first fluid and a second fluid, comprising:
a housing with volumes for the through-conduction of the first and of the second fluid,
a multiplicity of side wall members which divide the volume of the housing into a first volume and a second volume, as well as a multiplicity of tubes which extend between the first volumes and develop flow paths for the conduction of the first fluid,
wherein in the trapezoidally developed side wall members a multiplicity of passage apertures are developed;
wherein the housing is developed with one first connecting fitting and a second connecting fitting which are connected with a volume for the first fluid, and the housing is developed with a first connecting fitting and a second connecting fitting which are connected with a volume for the second fluid; and
wherein the connecting fittings for the second fluid are disposed on the first housing element and the connecting fittings for the first fluid are disposed on the second housing element.

8. A device for the heat transfer between a first fluid and a second fluid, comprising:
a housing with volumes for the through-conduction of the first and of the second fluid,
a multiplicity of side wall members which divide the volumes of the housing into a first volume and a second volume, as well as
a multiplicity of tubes which extend between the first volume and develop flow paths for the conduction of the first fluid,
wherein in the trapezoidally developed side wall members a multiplicity of passage apertures are developed;
wherein the housing comprises a first housing element and a second housing element;
wherein the housing is developed with recesses for receiving the side wall members; and
wherein within a second housing element at least one flow path is developed for conducting the first fluid.

* * * * *